United States Patent
Song

[15] 3,676,449
[45] July 11, 1972

[54] 1,3,4-THIADIAZOLE-BRIDGED THIOMETHYLENEPHENOL ANTIOXIDANTS

[72] Inventor: John Song, Bound Brook, N.J.

[73] Assignee: American Cyanamid Company, Stamford, Conn.

[22] Filed: Jan. 22, 1970

[21] Appl. No.: 5,090

[52] U.S. Cl. .................................260/302 SD, 260/45.8
[51] Int. Cl. .................................................C07d 91/62
[58] Field of Search .................................260/302 SD

[56] References Cited

FOREIGN PATENTS OR APPLICATIONS 748,422   5/1956   Great Britain.....................260/302

*Primary Examiner*—Alex Mazel
*Assistant Examiner*—R. J. Gallagher
*Attorney*—Philip Mintz

[57] ABSTRACT

1,3,4 - thiadiazole-bridged bis-thiomethylene-phenol compounds of the formula

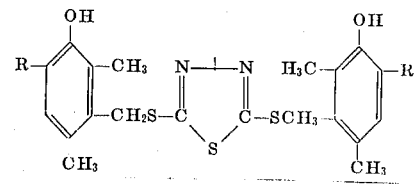

in which R is a tertiary alkyl of 4–12 carbon atoms are provided. They are excellent antioxidants for oxygen-sensitive organic materials, particularly polyolefins of 2–6 carbon atoms such as polypropylene plastics. They are prepared by condensing one mole of 2,5-dimercapto-1,3,4-thiodiazole with two moles of a 3-hydroxy-2,6-dimethyl-4-tertiary alkyl benzyl halide in the presence of an acid acceptor.

2 Claims, No Drawings

1,3,4-THIADIAZOLE-BRIDGED THIOMETHYLENEPHENOL ANTIOXIDANTS

This invention relates to 1,3,4-thiadiazole-bridged bis-thiomethylenephenol compounds of the formula

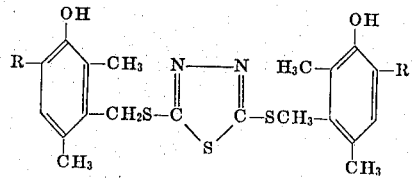

in which R is a tertiary alkyl of 4–12 carbon atoms. I have found that these compounds are excellent antioxidants for oxygen-sensitive organic materials, particularly polyolefins of 2–6 carbon atoms such as polypropylene plastics. They are prepared by condensing 1 mole of 2,5-dimercapto-1,3,4-thiadiazole with 2 moles of a 3-hydroxy-2,6-dimethyl-4-tertiary alkyl benzyl halide in the presence of an acid acceptor. The invention therefore includes the new compounds themselves, their method of preparation, compositions in which they are incorporated as antioxidants, and antioxidant processes in which they are used. It is a characterizing feature of the new compounds of my invention that two hindered phenol radicals containing thiomethyl substituents are linked through their sulfur atoms to the two carbon atoms of 1,3,4-thiadiazole. The thiomethylene radical is meta to the hydroxyl group and is therefore not in conjugation therewith; this imparts good antioxidant and non-staining properties to the compounds. In addition the phenolic hydroxyl is fully hindered by a methyl radical adjacent the thiomethylene substituent and by a larger tertiary alkyl of 4–12 carbon atoms on its opposite side. This ensures the formation of antioxidants that are non-discoloring in polyolefins and other light-colored synthetic and natural plastics. Representative tertiary alkyls that may be present at the 6-position of the phenol radical are tertiary butyl, 2,2-dimethylpropyl, dibutylene, tributylene and the like. Tertiary butyl is the preferred substituent.

The new compounds are prepared by reacting two moles of a 3-halomethyl-2,4-dimethyl-6-tert. alkylphenol with one mole of 2,5-dimercapto-1,3,4-thiadiazole in the presence of an acceptor for the halogen acid evolved. The reaction is preferably carried out in an anhydrous solvent such as methyl ethyl ketone, methyl isobutyl ketone or tetrahydrofuran and at reflux temperatures. The reaction is continued until the product formation is substantially complete, after which the crystalline reaction product is washed with water and dried. It may be further purified by recrystallization from benzene and chloroform.

The 3-halomethyl-2,4-dimethyl-6-tert. alkylphenols used in this process are prepared by reacting the corresponding 2,4-dimethyl-6-tert. alkylphenols with a hydrogen halide such as HCl and formaldehyde or methylal in the presence of HCl and $H_2SO_4$ by by the procedure of R. Wegler and E. Regel reported in Makromol. Chem. 9, 1(1952).

The compounds of this invention are especially useful as antioxidants for polyolefins (e.g., homopolymers or copolymers of mono$\alpha$-olefins of 2–6 carbons) in which they exhibit a high degree of activity and are non-discoloring. The compounds can be similarly used in other organic material normally subject to oxidative deterioration, including ABS resins (acrylonitrile-butadiene-styrene copolymers), the polyamides, polyacetals (e.g., polyformaldehyde), polystyrene, impact polystyrene, natural rubber and the various synthetic rubbers including ethylene-propylene copolymer rubbers, and in oils, fats, greases, gasoline and the like.

The compounds are incorporated into the various substrates according to any of the well known techniques, including milling, Banbury mixing, swelling, etc. In polypropylene the compounds are effectively incorporated by milling on a conventional two roll plastic mill. The compounds are effective as antioxidants over a range of concentration of from about 0.01 to about 5 percent. In polypropylene they are used preferably at a concentration of from 0.05 to 1 percent, based on the weight of the substrate. These quantities are sometimes hereinafter described as antioxidizing amounts of the antioxidant compound or compound mixture.

In the case of polymers, after milling, during which other ingredients such as filler, plasticizers and light absorbers may be added, the polymer composition is compression molded, cast, spun, injection molded or extruded to a shaped article.

The antioxidant activity of the compounds of this invention in polypropylene is greatly enhanced by concurrent use with esters of thiodipropionic acid, well known secondary stabilizers for polypropylene.

Oxidative deterioration of polypropylene and other similar oxidizable plastic materials is evident from the embrittlement which occurs on exposure to atmospheric oxygen. The extent to which the antioxidant protects against deterioration is measured by determining the hours to embrittlement at 140°–150° C. when a specimen 15–20 mils in thickness, containing the antioxidant, is exposed in a forced draft oven at this temperature.

The invention will be further described and illustrated by the following specific examples to which, however, it is not limited except as is indicated by the appended claims.

EXAMPLE 1

1,3,4-thiodiazole-2,5-bis (3,3′-thiomethylene-2,4-dimethyl-6-t.butylphenol)

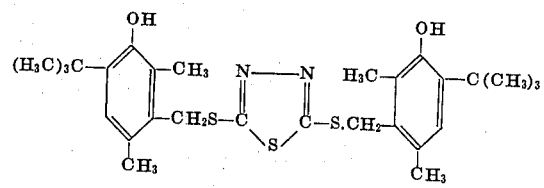

A mixture of 22.65 g. (0.10 mole) of 3-hydroxy-2, 6-dimethyl-4-tert-butyl benzylchloride, 7.51 g. (0.05 mole) of 2,5-dimercapto-1,3,4-thiadiazole, 13.8 g. (0.10 mole) of anhydrous potassium carbonate, and 0.5 g. of potassium iodide in 250 ml. of methylisobutyl ketone was placed in a 500 ml.-3-necked round bottom flask with an attached Dean-Stark water trap. The stirred mixture was heated to reflux for a period of 2½ hours.

The reaction was allowed to cool and the crystalline mass was collected, washed with water and dried in-vacuo to give 19.85 g. of crystals, m.p. 223°–225°. An additional quantity of 2 g. of product was isolated from the mother liquor.

Recrystallizations from benzene and chloroform gave an analytical specimen, m.p. 230°–2°.

Calc: C = 63.50; H = 7.17; N = 5.28; S = 18.11
Found: C = 61.72; H = 7.08; N = 5.01; S = 18.65

The assigned structure was confirmed by N.M.R. Spectroscopy.

EXAMPLE 2

The compound of Example 1 was incorporated into unstabilized polypropylene in an amount of 0.2 percent on the weight of the polymer by milling at 175°–180° C. The polypropylene was then compression molded into a film of 15–20 mils thickness. This was aged in a forced-draft oven at 140° C. along with other films of the same polypropylene containing no antioxidant. The efficiency of the compound was determined by noting the time to embrittlement at this temperature.

The polypropylene film containing the compound of Example 1 withstood heating for 725–750 hours before it became brittle while the control film reached its brittle point after only 2–4 hours.

What I claim is:
1. A compound of the formula

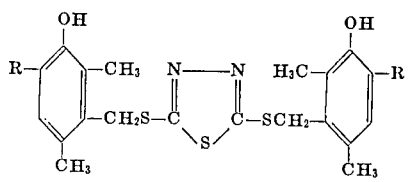
in which R is a tertiary alkyl of 4–12 carbon atoms.
2. A compound according to claim 1 having the formula
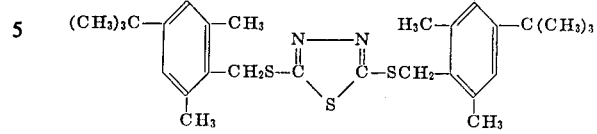
* * * * *